United States Patent [19]
Brady et al.

[11] 3,814,504
[45] June 4, 1974

[54] REFLECTING LENS ARRAY

[75] Inventors: John Francis Brady, Clifton; William Augustus Grill, Lake Parsippany, both of N.J.

[73] Assignee: Universal Technology Inc., Verona, N.J.

[22] Filed: Apr. 28, 1972

[21] Appl. No.: 248,725

[52] U.S. Cl.................. 350/167, 95/11, 350/201
[51] Int. Cl...................... G02b 17/08, G02b 27/00
[58] Field of Search .......... 350/199, 201, 167, 107, 350/128, 129

[56] References Cited
UNITED STATES PATENTS

| R19,070 | 2/1934 | Chretien | 350/199 UX |
| 2,608,129 | 8/1952 | Taylor | 350/199 |
| 3,397,362 | 8/1968 | Grayson et al. | 350/201 UX |
| 3,704,068 | 11/1972 | Waly | 350/167 X |

*Primary Examiner*—John K. Corbin
*Attorney, Agent, or Firm*—Pennie & Edmonds

[57] ABSTRACT

A reflecting-type fly's eye lens array is described having extremely high resolution capabilities. By means of photoresist techniques, a first array of similar reflecting surfaces are formed on each of a first multitude of substantially identical curved surfaces of a transparent medium and a second array of similar reflecting surfaces are formed on each of a second multitude of substantially identical curved surfaces of a transparent medium. The surfaces of the two multitudes are aligned with each other in one-to-one relationship so that each curved surface of the first multitude has a common optical axis with a corresponding curved surface of the second multitude. In addition, the reflecting surfaces of the first and second arrays are shaped in the characteristic ring and dot patterns of a Cassegrain or Gregorian lens; and the curvatures of the reflecting surfaces are selected such that electromagnetic radiation incident upon each ring-shaped reflective surface is reflected to the corresponding dot-shaped reflective surface. As a result, a multitude of small reflecting lenses are formed having an extremely high resolution that permits the fabrication by photoresist techniques of elements having submicron dimensions.

11 Claims, 11 Drawing Figures

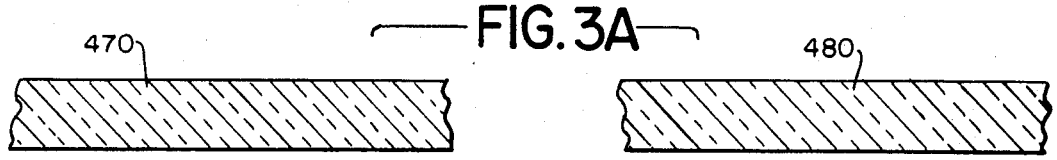
FIG. 3A
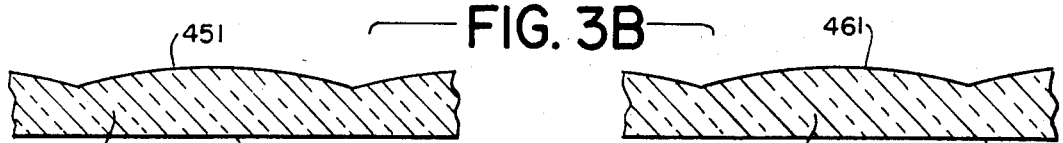
FIG. 3B
FIG. 3C
FIG. 3D
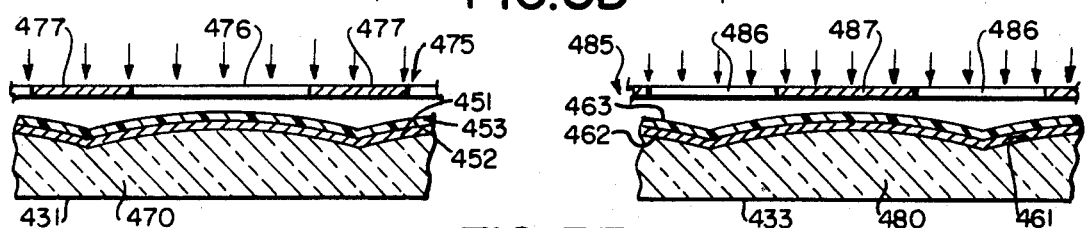
FIG. 3E
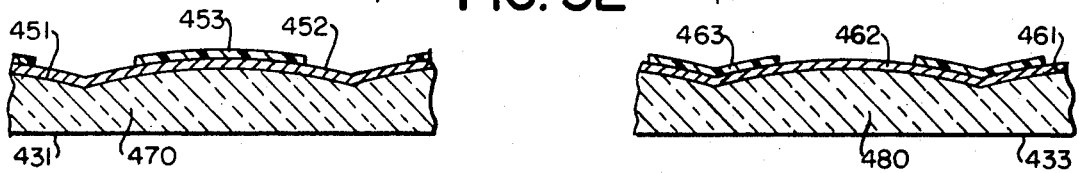
FIG. 3F
FIG. 3G
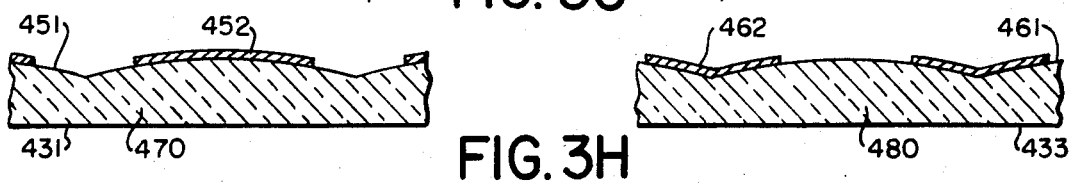
FIG. 3H
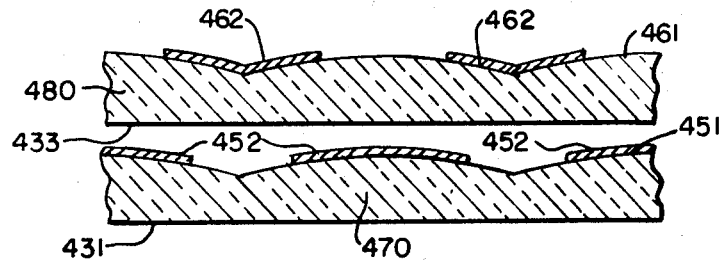

REFLECTING LENS ARRAY

BACKGROUND OF THE INVENTION

This concerns a fly's eye lens and in particular one using reflecting surfaces.

Fly's eye lenses are well known in the art, being described in such publications as "Fly's-Eye Lens Technique for Generating Semiconductor Device Fabrication Masks" at page 146 of the *IBM Journal of Research and Development* (April 1963) and U.S. Pat. No. 3,288,045. As described therein, a fly's eye lens comprises an array of tiny spherical lenslets. Such a lens may readily be formed by using a small steel ball, such as a ball bearing, to form a mold bearing an array of spherical depressions. This mold is then used to cast an array of spherical convex lenses on a major surface of a transparent medium such as Lucite. If desired, a similar array of spherical convex surfaces may also be cast on an opposed major surface of the transparent medium. By taking care to align the elements of the two arrays of convex surfaces, an array of bi-convex lenses is thereby formed.

The combination of a fly's eye lens and a recording medium can record sufficient information about an object as to permit the reconstruction of a three dimensional image of that object. Briefly, each lenslet in the fly's eye lens array records a slightly different, slightly offset image of the object; and, when light is directed back through these images and the lenslets in the fly's eye lens array, a three dimensional image of the original object is created. Because each lens records an image of the object, a fly's eye lens array may also be used to make many similar images of the same object. Thus, in the references cited above, the use of a fly's eye lens array has been proposed for making semiconductor masks where each mask consists of many copies of the same pattern. In still another application, fly's eye lenses may be used in optical memories.

It is difficult, however, to use conventional fly's eye lenses in applications such as optical memories and the fabrication of semiconductor masks where high resolution is required because fly's eye lenses typically are plagued by aberrations. Prominent among these aberrations are spherical aberration and curvature of field. In addition, it is desirable to use ultraviolet light in such applications because the theoretical resolution achievable increases with the frequency of light. However, satisfactory refractive materials are not available for use in conventional fly's eye lenses at ultraviolet frequencies.

SUMMARY OF THE INVENTION

To avoid such difficulties, we have devised a reflecting type fly's eye lens. This lens comprises first reflective means disposed on each of a first multitude of substantially identical curved surfaces of a transparent medium and a second reflective means disposed on each of a second multitude of substantially identical curved surfaces of a transparent medium. The curved surfaces of the two multitudes are aligned with each other in one-to-one relationship so that each curved surface of the first multitude has a common optical axis with a corresponding curved surface of the second multitude. The first and second reflective means are shaped in the characteristic ring and dot patterns of a Cassegrain or Gregorian lens; and the radii of curvature of the reflective means are such that electromagnetic radiation incident upon each first reflective means is reflected to a corresponding second reflective means.

Preferably, the curved surfaces are simple spherical surfaces that can easily be molded in plastic; and the reflective means are formed on these surfaces by photoresist techniques. The orientation of the curved surfaces in the preferred embodiment of our invention is such that each pair of a ring-shaped reflective means and a dot-shaped reflective means constitutes a Cassegrain-type system where the term "Cassegrain" is used in the broad sense to mean a reflecting system having a concave mirror and a convex mirror.

As is known in the art, the aberrations of reflecting systems are considerably less than those of comparable refractive systems; and reflecting systems can be designed to produce a flat field. Reflecting systems also work equally well at all frequencies of light, thereby making it possible to focus our lens in visible light and to use it with ultraviolet light without refocusing. In addition, reflecting systems can be made having short focal lengths and large fields such that $f$-numbers in the range $f$-1.5 to $f$-2.0 are possible. As a result, for this range of $f$-numbers, it is possible to form with our invention reflecting-type fly's eye lenses having theoretical resolutions on the order of 2,000 lines/millimeter or better when used with ultraviolet light.

These features of our reflecting-type fly's eye lens are extremely advantageous in the manufacture of semiconductor devices where our fly's eye lenses can be used to produce semiconductor photomasks having better resolution and smaller geometries than is now possible. These masks may then be used in known fashion to form semiconductor devices having features smaller than those of devices presently being made. This, in turn, makes it possible to operate certain semiconductor devices at higher frequencies than are now attained in comparable devices.

Similar improvements can be obtained by using our reflecting-type fly's eye lenses in other high reolution imaging applications such as optical memories.

Where desired, our reflecting-type fly's eye lens can be combined with other lens designs to form various catadioptric systems. For example, a Cassegrain-type fly's eye lens may be used with a correction plate to form a Schmidt-Cassegrain fly's eye lens. In such an application, the correction plate would be a multitude of aspheric surfaces each of which was aligned with one lenslet of the fly's eye lens. Other combinations of our reflecting fly's eye lens and known lens designs will be evident to those skilled in the art.

BRIEF DESCRIPTION OF THE DRAWING

These and other objects, features, and elements of our invention will become more readily apparent from the following detailed description of the drawing in which:

FIGS. 3A–3H are a schematic illustration of steps performed in making the illustrative embodiment of FIG. 1.

DETAILED DESCRIPTION OF THE DRAWING

Figure 1:
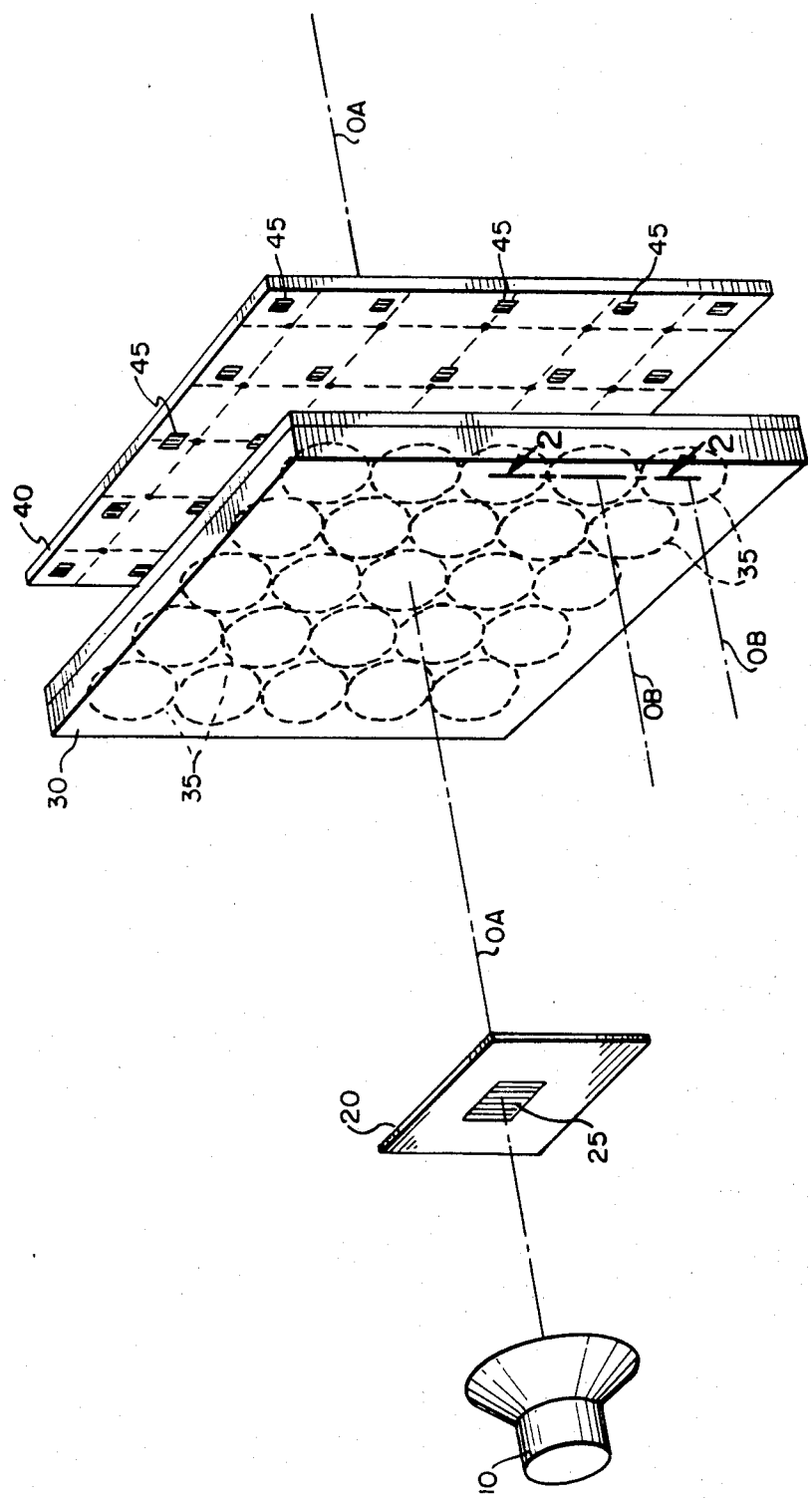
FIG. 1 is a schematic illustration of an embodiment of our invention.

FIG. 1 depicts the formation on a recording medium of many similar images of an object. The illustrative apparatus schematically shown in FIG. 1 comprises a light source 10, a transparency 20, a fly's eye lens 30, and a recording medium 40 disposed on optical axis OA. Light source 10 typically will vary with the application to which the apparatus of FIG. 1 is put. Because the theoretical resolution in an image increases with the frequency of the light used to form that image, light source 10 preferably is an ultraviolet light source when the apparatus of FIG. 1 is used to form high resolution images such as the images in a semiconductor mask. Transparency 20 is a conventional photographic transparency bearing a pattern 25 that is to be duplicated. For example, pattern 25 may be the pattern used to define the base region in a transistor.

Fly's eye lens 30 comprises an array of tiny substantially identical lenslets 35. Each one of these lenslets forms on recording medium 40 an image 45 of pattern 25. As shown in FIG. 1, each lenslet 35 has an optical axis OB that is parallel with the optical axis OA of the entire system. Because pattern 25 is located at a different place with respect to each optical axis OB, the images 45 of this pattern are also located at different places with respect to the optical axis OB of each lenslet. Thus, as shown in FIG. 1, each of the images 45 in the top line on recording medium 40 is displaced upward from the optical axis OB of the lenslet that forms the image. Moreover, the images at the extreme right and left-hand sides are displaced a maximum amount to the right and to the left, respectively; and the other images are displaced lesser amounts with the center image being centered exactly over the optical axis OB of the lenslet that images it.

Recording medium 40 may be any suitable material that will record an image when exposed to electromagnetic radiation. For example, it may be a high resolution photographic plate.

In the prior art, each lenslet in a fly's eye lens typically is a small plano-convex or bi-convex lens in which each convex surface is spherical. Such a lens has pronounced spherical aberration and curvature of field. To minimize such aberrations, we form each lenslet 35 in fly's eye lens 30 so that it is a Cassegrain-type lens. A cross section along line 2—2 of FIG. 1 is shown in FIG. 2 to illustrate the construction of our fly's eye lens.

Figure 2:
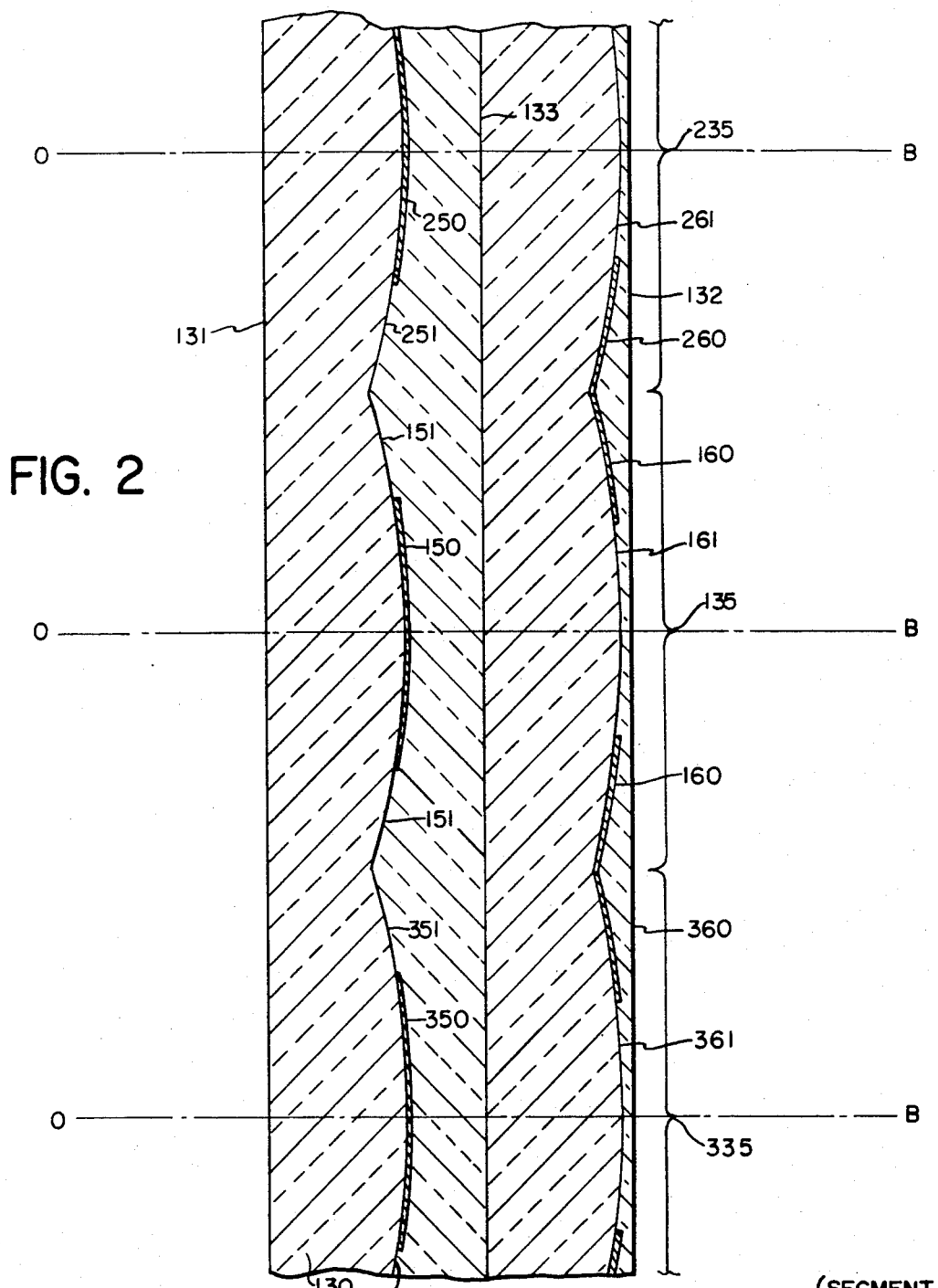
FIG. 2 is a cross section along line 2—2 of FIG. 1.

FIG. 2 illustrates a lenslet 135 and portions of two adjacent lenslets 235 and 335 formed in a transparent medium 130. Transparent medium 130 has two exterior major surfaces 131 an 132. As will be detailed below, reflective means 150 and 160 are formed on curved surfaces 151 and 161 in lenslet 135. Similarly, reflective means 250 and 260 are formed on curved surfaces 251 and 261 of lenslet 235; and reflective means 350 and 360 are formed on curved surfaces 351 and 361 of lenslet 335. Each lenslet is symmetric about its optical axis OB with the result that reflecting means 150, 250, 350 are circular or "dot" shaped and reflecting means 160, 260, 360 are annular or "ring" shaped. In a preferred mode of our invention, each curved surface is spherical and the curved surfaces of each lenslet have a common center of curvature on the optical axis OB of that lenslet.

As detailed in FIGS. 3A—3H, fly's eye lens 30 is made according to our invention in two sheets 470, 480 of a transparent material such a Lucite. First, an array of curved surfaces is defined in each sheet of Lucite. Following practices known in the art, two molds are formed bearing depressions that define the desired curvatures of the two curved surfaces of each lenslet. Each of these molds is then pressed against one of the transparent sheets to form one major surface of that sheet into an array of curved surfaces. By these means, two transparent sheets are formed, as shown in FIG. 3B, each of which has one major surface 431, 433 that is flat and another major surface 451, 461 that is an array of curved surfaces. For purposes of illustration, FIGS. 3A–3H depict only portions of sheets 470, 480 that are comparable in size to the cross section of FIG. 2.

The curved surfaces are then cleaned by ionization, and the sheets are placed in a vacuum deposition chamber. A suitable reflecting material, preferably aluminum, is then vacuum evaporated onto each array of curved surfaces to form on each sheet a continuous reflecting film several microns thick.

To define the reflective surfaces, the vacuum evaporated film on each sheet is first covered with a layer of photoresist. Preferably, this photoresist is any conventional photoresist used in the semiconductor manufacturing art. For example, the photoresist may be polyvinyl alcohol. Standard techniques known in the semiconductor art may be used for applying the photoresist to the vacuum evaporated film. As a result, as depicted in FIG. 3C, each of the transparent sheets 470, 480 has a reflecting film 452, 462 on top of curved surfaces 451, 461 and a layer 453, 463 of photoresist covers the reflecting film. For clarity, the thicknesses of films 452, 462 and layers 453, 463 have been exaggerated in FIGS. 3C–3H.

Appropriate masks 475, 485 shown in FIG. 3D are then aligned with the photoresist-covered reflecting films. Each maks bears an array of transparent regions 476, 886 and opaque regions 477, 487 corresponding to the array of curved surfaces and shaped to define desired reflective means. Specifically, to form the dot-shaped reflective means 150, 250, 350 of FIG. 2, mask 475 is an array of transparent circular regions 476 having center-to-center spacings that are the same as the spacings between the optical axis OB of adjacent lenslets. Mask 475 is aligned by centering the transparent regions 476 of the mask on the centers of curved surfaces 451. Similarly, to form ring-shaped reflective means 160, 260, 360, mask 485 is an array of opaque circular regions 487 having the same center-to-center spacings as mask 475. When masks 475, 485 are aligned, actinic radiation is directed through the transparent regions 476, 486 to polymerize photoresist layers 453, 463. This produces acid-resistant layers in the portions of photoresist underlying the transparent portions of the masks.

As indicated by FIG. 3E, the unpolymerized portions of photoresist layers 453, 463 are then removed by rinsing in Kodak developer or trichloroethylene to expose the underlying portions of reflecting films 452, 462. The exposed portions of films 452, 462 are next removed as shown in FIG. 3F by immersing the films in an etching solution such as sodium hydroxide. After the exposed films have been removed, the polymerized portions of the photoresist layers 453, 463 are removed using known methods. As a result of these procedures, reflective surfaces 450, 460 are defined on each curved surface 451, 461 of the transparent media 470, 480.

Obviously, the extent of each reflective surface 450, 460 is determined by the size of the transparent regions 476, 486 in the masks 475, 485 used to expose photoresist layers 453, 463. Thus, by the use of suitable masks, reflecting regions of an size and shape may be formed; and, in particular, reflective means 150, 250, 350 and reflective means 160, 260, 360 of FIG. 2 may be formed.

After the reflective means are formed on the surfaces of the transparent sheets, the transparent sheets are aligned with each other as shown in FIG. 3H so that each curved surface on one sheet has a common optical axis OB with a curved surface on another sheet. In addition, in the preferred mode of our invention where each curved surface is a spherical surface, the curved surfaces are spaced apart so that each pair of curved surfaces has a common center of curvature located on the optical axis of that pair. To maintain the proper spacing between the curved surfaces, the region between the two transparent sheets may be filled in with the same material as the transparent sheets. Moreover, a flat exterior surface may be formed by flowing the same material over curved surface 461. The resulting structure is that shown in the cross section of FIG. 2, where a portion of sheet 470 is the region between exterior surface 131 and curved surfaces 151, 251, 351 and a portion of sheet 480 is the region between an interior surface 133 and curved surfaces 161, 261, 361.

Flat exterior surface 132 is, of course, the surface formed over curved surfaces 161, 261, 361.

The spherical aberration of a reflecting device is appreciably less than that of a comparable refracting lens. Accordingly, our reflecting-type fly's eye lens is quite useful in high resolution applications such as the formation of a set of photographic masks for the fabrication of semiconductor devices. Each mask in such a set is made from a different transparency by apparatus such as that of FIG. 1. Each transparency 20 that is duplicated by fly's eye lens 30 is carefully aligned and is illuminated to expose a different recording medium 40. Because the same fly's eye lens is used in forming all the photographic masks in the set, the center-to-center spacings between images formed by the same lenslets at corresponding positions on different recording media, and therefore on different masks, are the same. Moreover, because each transparency 20 is aligned with lens 30 in exactly the same position, all the images on the different masks that are formed are properly aligned with each other. The masks that are formed by the apparatus of FIG. 1 may serve as masters from which copies are made for use in manufacturing semiconductor devices. Alternatively, the masks that are made with the apparatus of FIG. 1 may themselves be used in fabricating the semiconductor devices.

Figure 4:
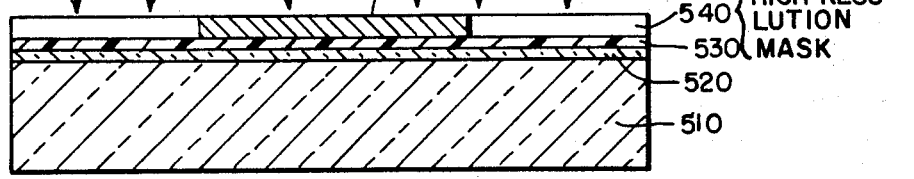
FIG. 4 is a schematic illustration of a use of a semiconductor mask formed by the illustrative embodiment of FIG. 1.

FIG. 4 illustrates the use of our masks in forming a semiconductor device in a small portion of a "chip" of a semiconductor material 510, such as silicon. It will be understood by those skilled in the art that numerous such devices are defined simultaneously in other portions of the chip of semiconductor material. On the surface of the silicon is a layer of silicon dioxide 520 and on top of this layer is a layer 530 of photoresist. In forming semiconductor devices, masks 540 made according to our invention are aligned with indicia (not shown) on the semiconductor material and are placed on top of the photoresist layer 530 so that they are in contact with this layer or nearly in such contact.

For purposes of illustration, FIG. 4 shows a portion of a mask 540 that is used to define the base regions of a transistor in silicon chip 510. In the center of this portion of the transistor, actinic radiation is directed through transparent regions in mask 540 to polymerize the exposed portions of photoresist layer 530. After exposure, the unpolymerized portions of the photoresist are dissolved to expose portion of silicon dioxide layer 520, and layer 520 is then etched by hydrofluoric acid to expose the underlying silicon. Finally, suitable impurities are diffused into the silicon to form the base region of the transistor.

By reapplying the layer of photoresist, aligning with the base regions a second mask having appropriate opaque regions and using the same sequence of steps detailed above, other features of the transistor may be defined. In this fashion, complicated semiconductor devices may be fabricated on the silicon chip.

The size of the features of the devices that are formed depends in part on the quality of masks 540. Semiconductor masks formed with conventional refracting-type fly's eye lenses have resolutions of approximately 500 lines/millimeter when formed with visible light of 5500 Angstroms wavelength. Semiconductor masks made with a reflecting-type fly's eye lens according to our invention can have approximately twice this resolution or about 1000 lines/millimeter at 5,500 Angstroms. In addition, because our reflecting-type fly's eye lens may be used with ultraviolet light, it is possible with our invention to form semiconductor masks having resolutions in excess of 1,500 lines/millimeter. For example, with ultraviolet light of 3,000 Angstroms wavelength, semiconductor masks can be made having a resolution of approximately 2,000 lines/millimeter.

The quality of a set of photographic masks is also affected by minute variations from mask to mask in the spacing between patterns located at the same or corresponding positions on each mask. As noted above, in forming semiconductor devices, it is necessary to align several masks of a set with various features previously defined by other masks of the set. With masks formed by step-and repeat techniques, minute variations in spacing are inevitable; and the alignment that is achieved by only a compromise. Consequently, various features of the semiconductor devices cannot be made as small or as precisely as desired. With our invention, however, all the masks in a set are made with the same reflecting-type fly's eye lens, and the center-to-center spacing between images at the same or corresponding positions on different masks is therefore the same. Thus, the alignment between a mask and features previously defined by another mask in the set need not be a compromise; and the extremely high resolution of our masks may be used to maximum advantage. Specifically, semiconductor devices may be formed having smaller and more precise features than heretofore. Because the maximum frequency of operation of some semiconductor devices is inversely proportional to the size of certain features of the device, higher frequency semiconductor devices may be manufactured using masks formed according to our invention.

Our reflecting-type fly's eye lens may also be used in numerous other applications simply be substituting it for conventional refractive fly's eye lenses. For example, our reflecting-type fly's eye lens may be used in place of conventional fly's eye lenses to form three-dimensional images having extremely high resolution.

In another application, our reflecting-type fly's eye lens may be substituted for the conventional fly's eye lenses used in fly's eye lens optical memories. In these applications and in others that will be evident to one skilled in the art, the use of our reflecting-type fly's eye lens will, in general, greatly improve the imaging qualities of the optical system in which it is placed.

In the preferred embodiment of our invention, the reflecting surfaces have spherical curvature and each pair of aligned spherical reflecting surfaces has a common center of curvature. One such fly's eye lens that we are studying is made of lenslets having a 7 millimeter aperture. The radius of curvature of the surface corresponding to surface 151 of FIG. 2 is about 12.5 millimeters and the radius of curvature of the surface corresponding to surface 161 of FIG. 2 is about 15.5 millimeters. For these parameters, the focal length of each lenslet is about 14.5 millimeters and the f-number of the lens is about 2.1.

Each ring-shaped reflective surface corresponding to reflective surface 160 of FIG. 2 fills the aperture of the lenslet in which it is located and therefore has an outer diameter of 7 millimeters. Each dot-shaped reflective surface corresponding to reflective surface 150 of FIG. 2 is smaller in extent but is large enough to intercept a light ray reflected by the outer periphery of the ring-shaped reflective surface. For the curvatures of the reflective surfaces set forth above, reflective surface 150 must have a diameter of approximately 4 millimeters. The light rays reflected by surface 150 then leave the lenslet through the non-reflecting center of ring-shaped reflecting surface 160. To prevent stray light from passing through a lenslet without being reflected, the ring-shaped reflective surface must overlap the dot-shaped reflective surface. Accordingly, the inner diameter of the ring-shaped reflective surface must be less than approximately 4 millimeters.

As is known in the art, reflecting-type lenses may also be made using non-spherical reflective surfaces such as the parabola, the hyperbola and the ellipse. Although it is more difficult to form non-spherical reflective surfaces in the reflecting-type fly's eye lens of our invetion, fly's eye lenses having such surfaces could be made following the principles of our invention. Because the term "Cassegrain" is used in this application to refer broadly to a reflecting system having a concave reflective surface and a convex reflective surface, it is understood to include such non-spherical reflective surfaces.

Our invention may also be practiced with a reflecting-type fly's eye lens in which both reflective surfaces of a lenslet are concave. This reflecting system will be called a Gregorian-type fly's eye lens.

The particular method detailed for making the reflecting-type fly's eye lens is only illustrative. As is well known, there are numerous types of photoresists that may be used in fabricating the lens. With some of these photoresists, it is the exposed areas of the photoresist that provide an acid resistant coating that protects the underlying metal. With outer types of photoresist, it is the exposed portions of photoresist that are removed to lay bare the underlying metal that is to be etched. With either type of photoresist, the steps of defining the reflective surfaces of our fly's eye lens will be evident. While we prefer to use Lucite as a material for fabricating our lens, it will be recognized that other materials having similar properties may be used.

We prefer to use an ultraviolet light source in making semiconductor masks according to our invention because the resolution that can be obtained increases with increasing frequency. However, it will be recognized that the use of reflecting optics rather than refracting optics permits one to image a very broad spectrum of electromagnetic radiation. Accordingly, it is contemplated that our invention may be employed to advantage using light sources in the infrared, visible and ultraviolet regions.

As will be obvious to those skilled in the art, numerous other modifications may be made to the preferred embodiment described and illustrated herein without departing from the invention as defined in the claims.

What is claimed is:

1. A fly's eye lens comprising a multitude of small reflecting lenses having a finite focal length, each of said lenses comprising first and second curved surfaces defined in and integral with a transparent medium and first and second reflective means defined on said first and second surfaces, respectively, said first and second reflective means being aligned with each other and having appropriate shape and curvature that incident electromagnetic radiation is transmitted through portions of the second curved surfaces over which the second reflective means do not extend, is reflected by the first reflective means to the second reflective means, and is reflected by the second reflective means through portions of the first curved surfaces over which the first reflective means do not extend.

2. The fly's seye lens of claim 1 wherein the first and second curved reflecting surfaces are spherical.

3. The fly's eye lens of claim 2 wherein:
the first spherical reflecting surface has a radius of curvature that is less than the radius of curvature of the second spherical reflecting surface;
the first reflecting surface is smaller in extent than the second reflecting surface; and
the second reflecting surface is annular in shape.

4. The fly's eye lens of claim 3 wherein the reflecting lens have an $f$-number of less than approximately 2.1.

5. The fly's eye lens of claim 1 wherein each reflecting lens is a Cassegrain-type reflecting lens.

6. The fly's eye lens of claim 5 wherein each reflecting lens has first and second spherical reflecting surfaces that have the same center of curvature.

7. Optical apparatus having a finite focal length comprising:
a first transparent medium on the surface of which and integral thereto is defined a first multitude of substantially identical curved surfaces;
first reflective means disposed on each of the first multitude of substantially identical curved surfaces, each of said first reflective means having a similar shape;
a second transparent medium on the surface of which and integral thereto is defined a second multitude of substantially identical curved surfaces; and
second reflective means disposed on each of the second multitude of substantially identical curved surfaces, each of said second reflective means having a similar shape, the curved surfaces in said first and second multitudes being aligned with each other in one-to-one relationship so that each of substantially all curved surfaces of the first multitude has a common optical axis with a corresponding curved surface of the second multitude, the curvatures of the surfaces of the first and second multitudes and the shapes of the first and second reflective means being such that incident electromagnetic radiation is transmitted through portions of the second curved surfaces over which the second reflective means do not extend, is reflected by most first reflective means to a corresponding second reflective means, and is reflected therefrom through portions of the corresponding first curved surfaces over which the first reflective means do not extend.

8. The optical apparatus of claim 7 wherein the curved surfaces of the first and second multitudes of surfaces are spherical.

9. The apparatus of claim 8 wherein:
the spherical surfaces of the first multitude of surfaces have a radius of curvature that is less than the radius of curvature of the spherical surfaces of the second multitude of surfaces;
the first reflective means is smaller in extent than the second reflective means; and
the second reflective means is annular in shape.

10. The optical apparatus of claim 9 wherein corresponding spherical surfaces of the first and second multitudes of spherical surfaces have the same center of curvature.

11. The optical apparatus of claim 9 wherein corresponding first and second reflective means constitute a lens having an f-number of less than approximately 2.1.

* * * * *

PO-1050
(5/69)

UNITED STATES PATENT OFFICE
CERTIFICATE OF CORRECTION

Patent No. 3,814,504        Dated June 4, 1974

Inventor(s) John Francis Brady and William Augustus Grill

It is certified that error appears in the above-identified patent and that said Letters Patent are hereby corrected as shown below:

Column 3, line 33, "to he left" should read --to the left--.

Column 4, line 37, "Each maks" should read --Each mask--.

Column 5, line 39, "by fly's eye lens 30 is carefully aligned and is illuminated to expose a" should read --by fly's eye lens 30 is carefully aligned in exactly the same position with respect to fly's eye lens 30 and is illuminated to expose a--.

Column 6, line 64, "simply be" should read --simply by--.

Column 7, line 60, "With outer" should read --With other--.

Column 8, line 34, "fly's seye" should read --fly's eye--.

Column 8, line 44, "lens have" should read --lenses have--.

Signed and sealed this 1st day of October 1974.

(SEAL)
Attest:

McCOY M. GIBSON JR.
Attesting Officer

C. MARSHALL DANN
Commissioner of Patents